(12) United States Patent
Mueller et al.

(10) Patent No.: US 7,770,921 B2
(45) Date of Patent: Aug. 10, 2010

(54) AIRBAG FOR PROTECTION OF A VEHICLE OCCUPANT

(75) Inventors: Louis Mueller, W Roy, UT (US); Erik Sandwall, Alingsas (SE); Henrik Öhrvall, Bastad (SE); Gustav Börjeson, Alingsas (SE)

(73) Assignee: Autoliv Development AB, Vargarda (SE)

( * ) Notice: Subject to any disclaimer, the term of this patent is extended or adjusted under 35 U.S.C. 154(b) by 336 days.

(21) Appl. No.: 11/753,822

(22) Filed: May 25, 2007

(65) Prior Publication Data

US 2008/0290637 A1   Nov. 27, 2008

(51) Int. Cl.
B60R 21/239   (2006.01)

(52) U.S. Cl. .................................... 280/739; 280/730.2

(58) Field of Classification Search ................ 280/739, 280/730.2
See application file for complete search history.

(56) References Cited

U.S. PATENT DOCUMENTS

| | | | |
|---|---|---|---|
| 5,492,363 A * | 2/1996 | Hartmeyer et al. ........... 280/739 |
| 5,853,191 A * | 12/1998 | Lachat ..................... 280/730.2 |
| 5,899,490 A * | 5/1999 | Wipasuramonton et al. ....... 280/730.2 |
| 5,931,497 A * | 8/1999 | Fischer .................... 280/743.1 |
| 6,270,113 B1 * | 8/2001 | Wipasuramonton et al. ....... 280/730.2 |
| 6,478,329 B1 * | 11/2002 | Yokoyama .................. 280/729 |
| 6,502,858 B2 * | 1/2003 | Amamori .................. 280/743.2 |
| 6,783,151 B2 * | 8/2004 | Rasch et al. ................ 280/729 |
| 6,932,385 B2 * | 8/2005 | Hawthorn et al. ........... 280/739 |
| 7,168,733 B2 * | 1/2007 | Kumagai et al. .......... 280/730.2 |
| 7,237,802 B2 * | 7/2007 | Rose et al. ................ 280/743.1 |
| 7,261,319 B2 * | 8/2007 | DePottey et al. ............ 280/739 |
| 7,316,415 B2 * | 1/2008 | Jamison ..................... 280/729 |
| 7,431,329 B2 * | 10/2008 | Taguchi et al. .............. 280/729 |
| 7,445,237 B2 * | 11/2008 | Boyle et al. ................. 280/739 |
| 7,475,904 B2 * | 1/2009 | Hofmann et al. ............ 280/739 |
| 7,543,849 B2 * | 6/2009 | Bradburn ................... 280/739 |
| 7,581,752 B2 * | 9/2009 | Kai et al. ................ 280/730.2 |
| 2004/0130127 A1 * | 7/2004 | Kurimoto et al. ............ 280/729 |
| 2005/0006883 A1 * | 1/2005 | Sato et al. ................ 280/730.2 |
| 2005/0098990 A1 * | 5/2005 | Pinsenschaum et al. ..... 280/739 |
| 2007/0045997 A1 * | 3/2007 | Abe et al. .................... 280/729 |
| 2007/0164546 A1 * | 7/2007 | Kai et al. ................ 280/730.2 |
| 2007/0267854 A1 * | 11/2007 | Fukuda et al. ........... 280/730.2 |
| 2007/0278774 A1 * | 12/2007 | Ishiguro et al. ............. 280/740 |
| 2008/0018086 A1 * | 1/2008 | Ford et al. ................... 280/739 |
| 2008/0073892 A1 * | 3/2008 | Rose et al. .................. 280/739 |

* cited by examiner

*Primary Examiner*—Paul N Dickson
*Assistant Examiner*—Nicole Verley
(74) *Attorney, Agent, or Firm*—Brinks Hofer Gilson & Lione

(57) ABSTRACT

In at least one embodiment, the present invention provides a side airbag for protection of a vehicle occupant. The side airbag is adapted to be inflated by gas from an inflator. The side airbag comprises a side panel which forms an exterior of the side airbag. The side panel defines a vent hole for venting the gas to outside the side airbag. A closing panel is disposed about the vent hole. The closing panel is configured such that the vent hole is unobstructed to vent the gas during inflation of the side airbag until the side airbag is substantially inflated. The side and closing panels cooperate to obstruct the vent hole with the closing panel such that the gas is substantially not vented. When the side airbag is obstructed from substantially inflating, for example due to the proximity of an out-of-position occupant, the vent hole remains unobstructed to vent the gas.

21 Claims, 10 Drawing Sheets (Section A-A)

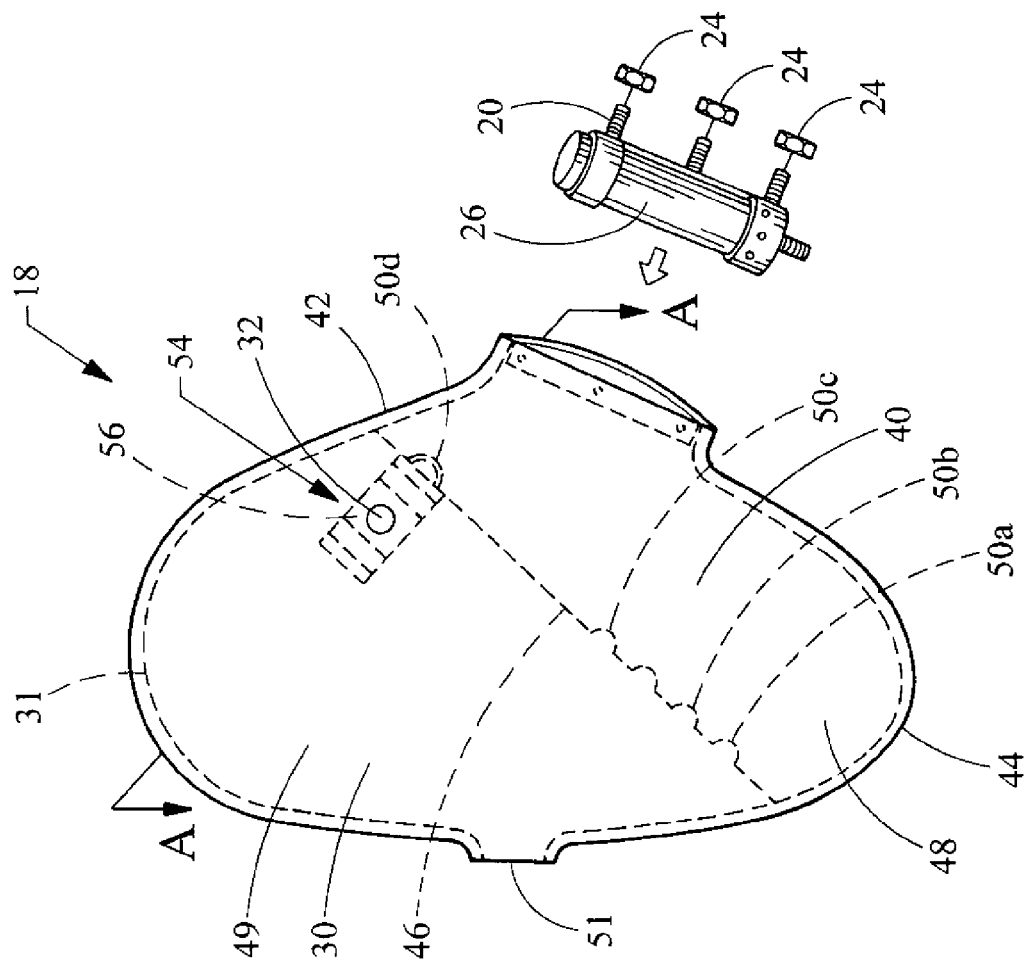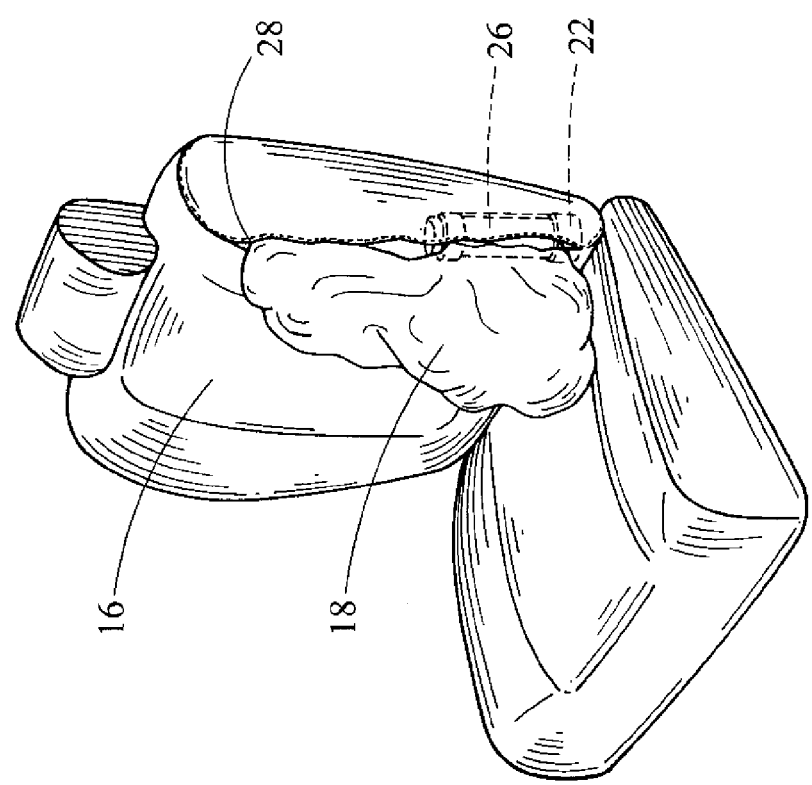

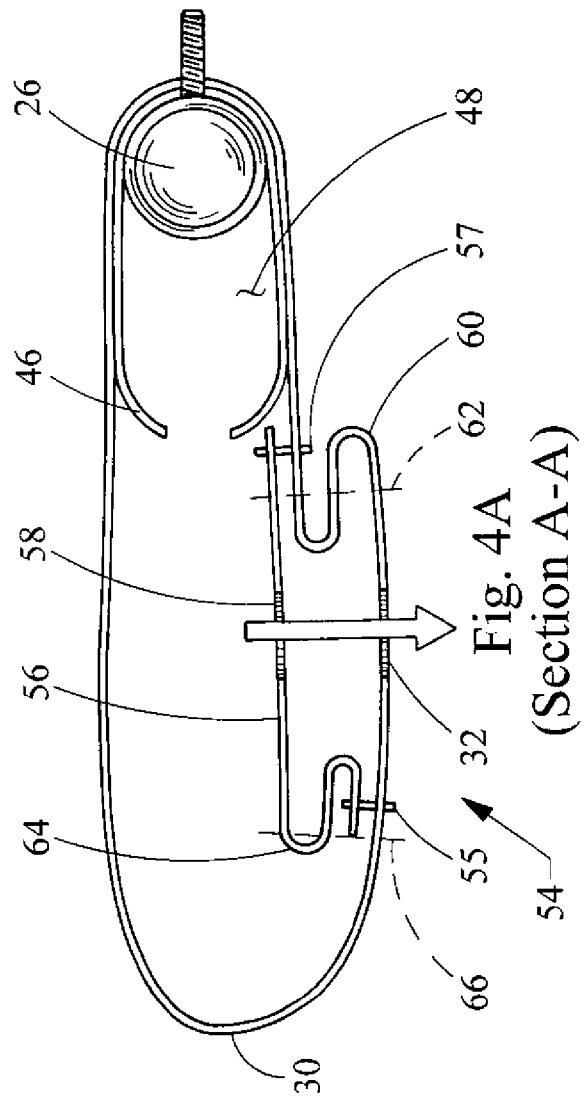
Fig. 4A (Section A-A)
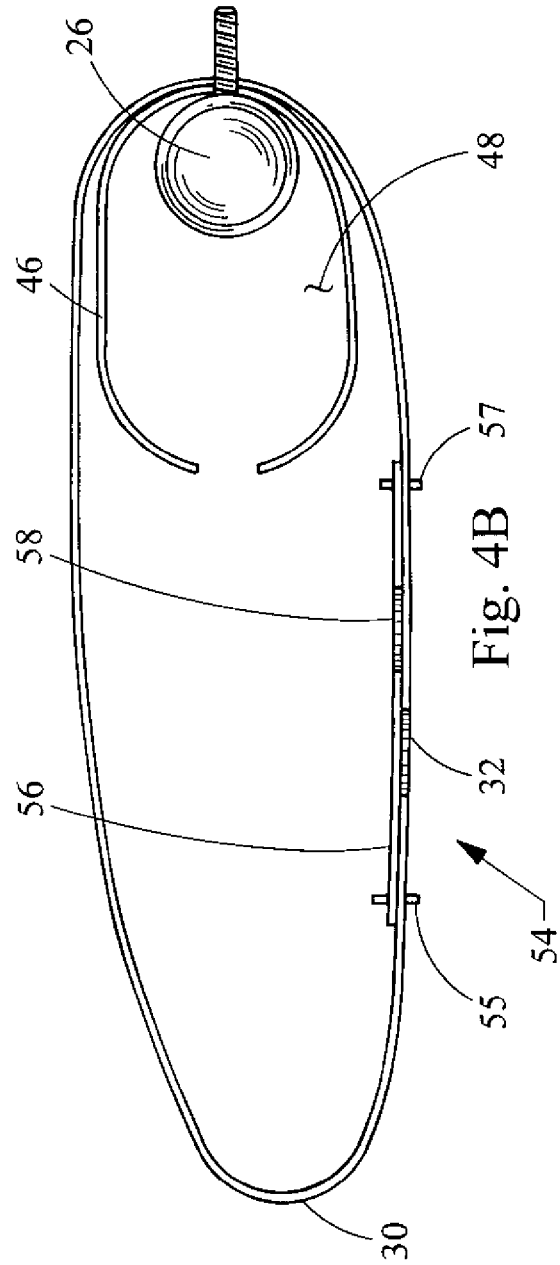
Fig. 4B

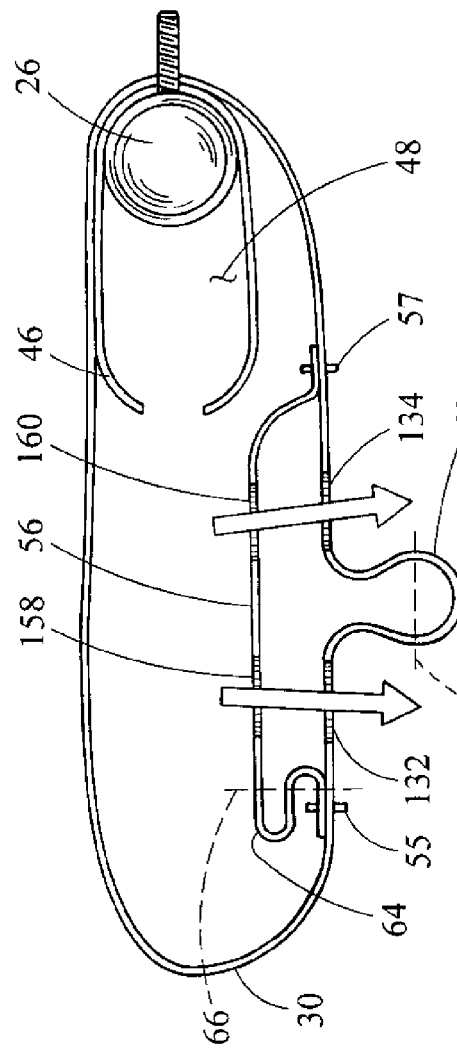
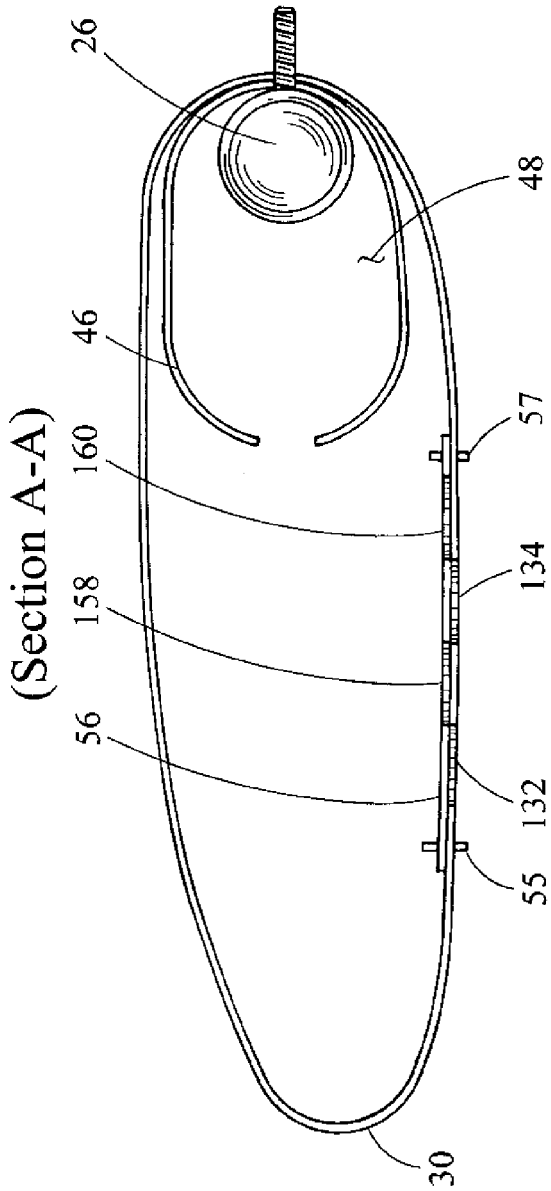
Fig. 5A (Section A-A)
Fig. 5B

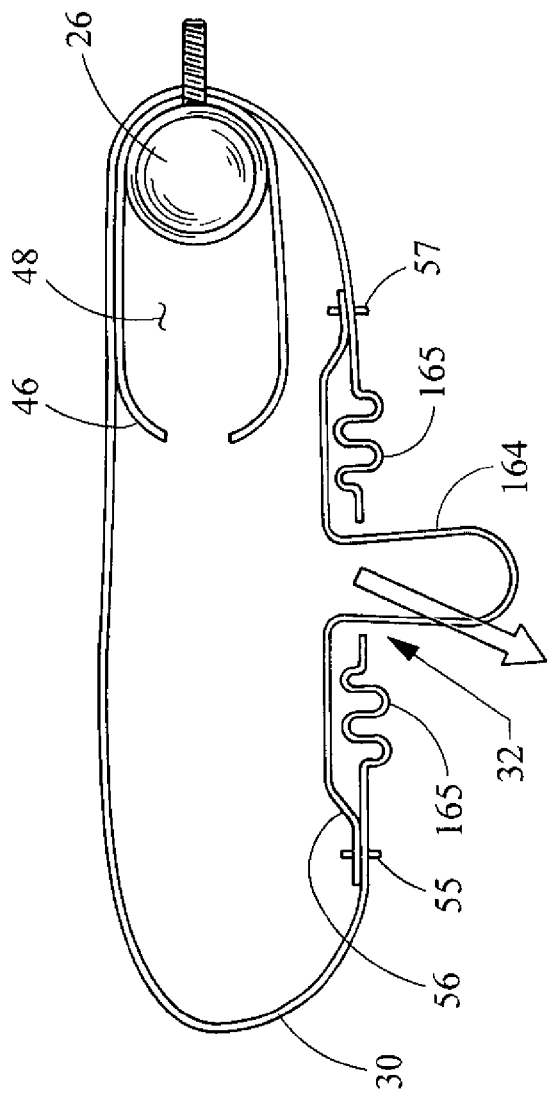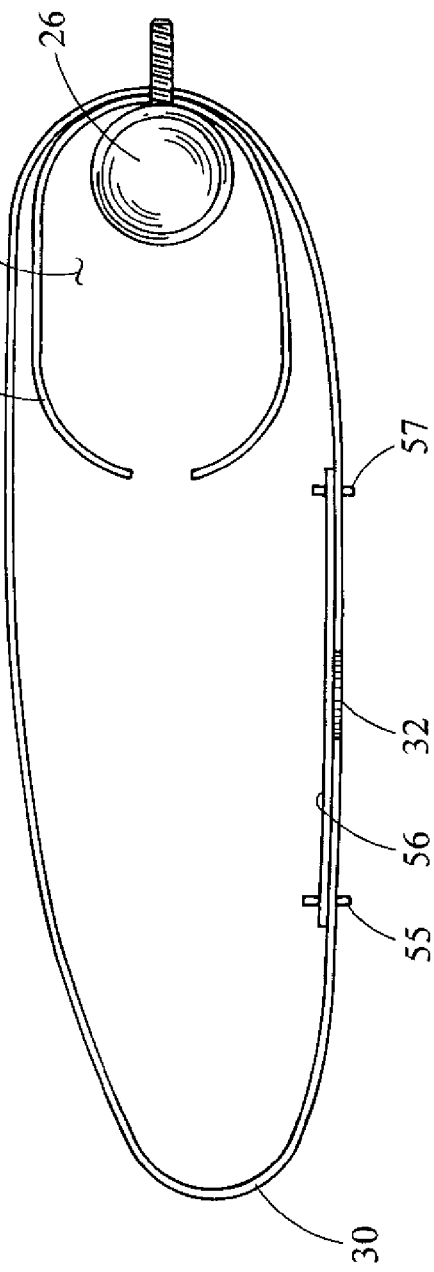
Fig. 6A
Fig. 6B

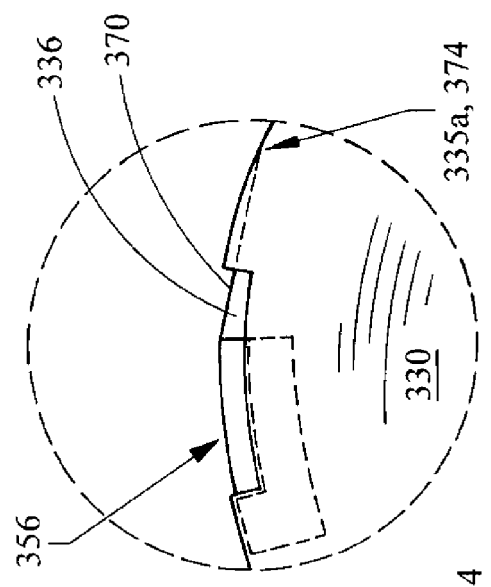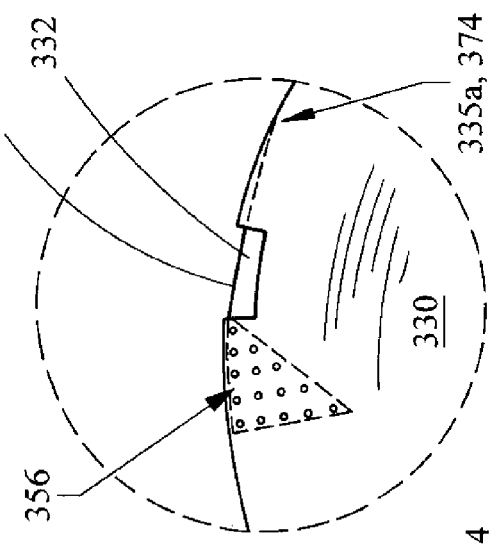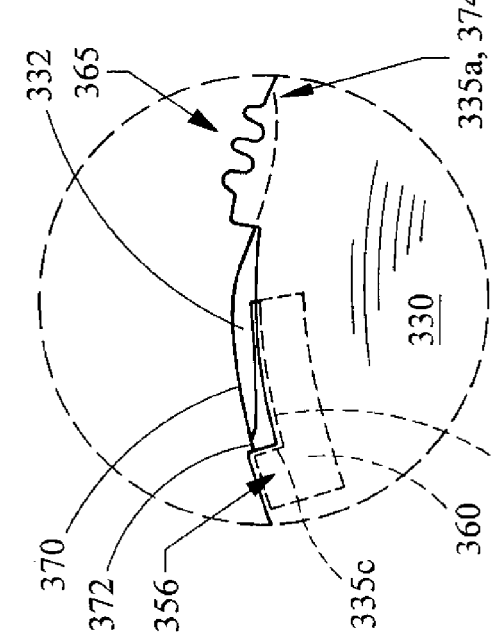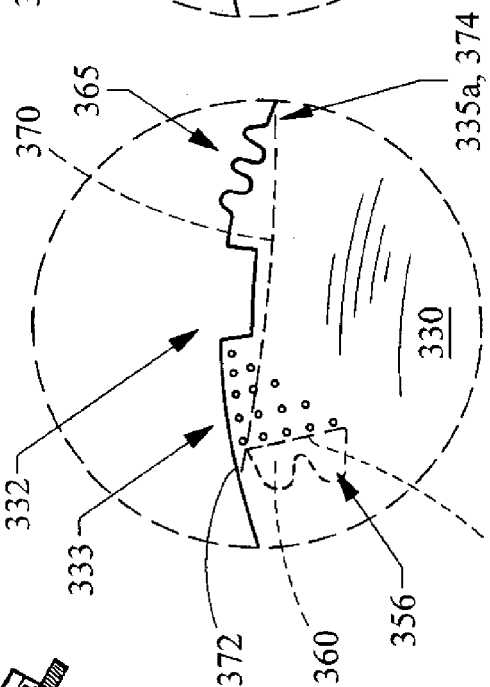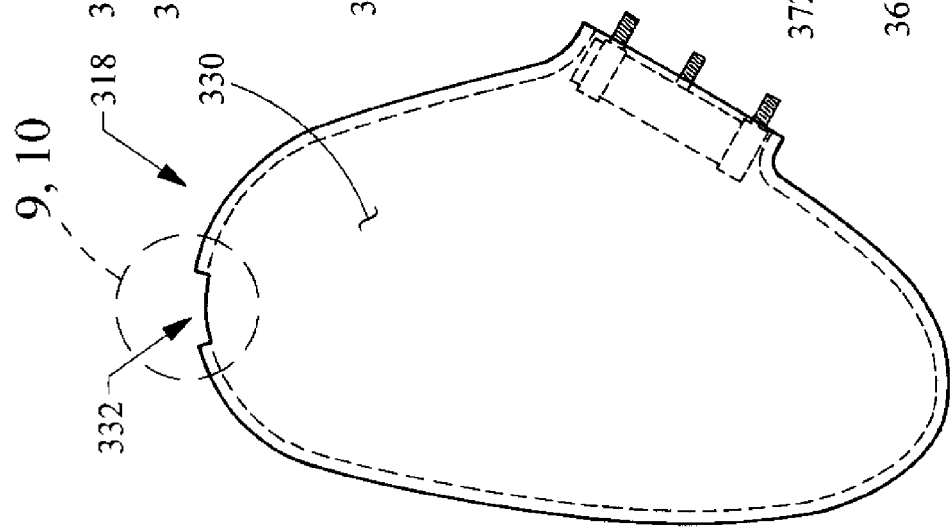

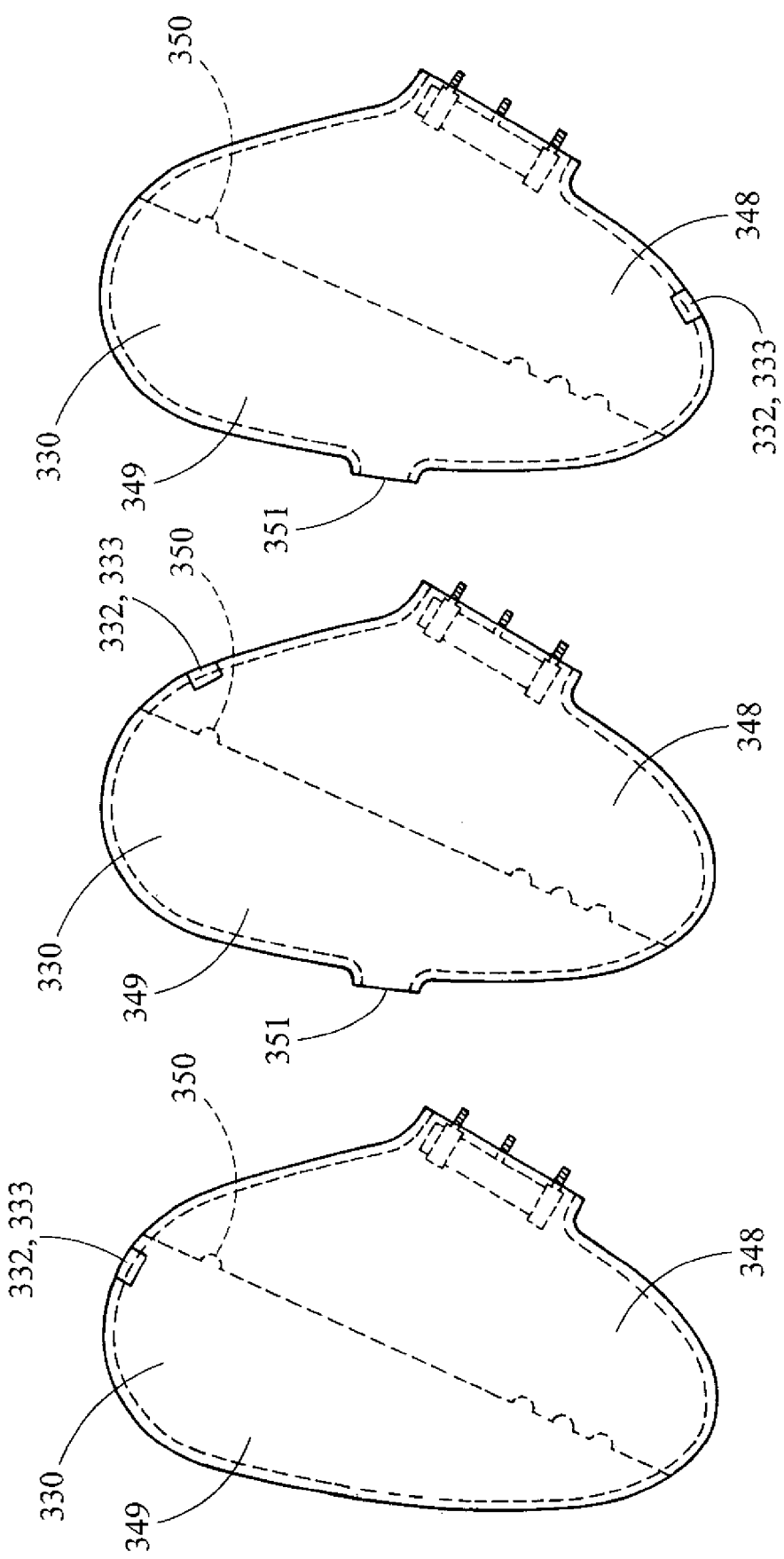

AIRBAG FOR PROTECTION OF A VEHICLE OCCUPANT

CROSS REFERENCE TO RELATED APPLICATION

This application claims priority to U.S. patent application Ser. No. 11/784,594 filed Apr. 9, 2007.

BACKGROUND OF THE INVENTION

1. Field of Invention

The invention generally relates to a vehicular safety restraint system and more particularly to an airbag which can protect an occupant during a vehicle collision.

2. Background

Many inventions dealing with airbag systems have been proposed. These systems generally comprise an inflator and an airbag. The airbag is installed prior to inflation in a compact folded or rolled condition. Upon sensing the occurrence of an impact collision via various sensors, such as for example, in a side impact collision with a vehicle having a side airbag system, a vehicle mounted crush sensor or accelerometer generates a control signal. The control signal causes the inflator to be activated, thereby producing or releasing inflation gas. The inflation gas inflates the airbag. Ideally, a side impact airbag is positioned between the side of the occupant and an adjacent side of the vehicle to adequately protect the occupant. However, during operation of the vehicle an occupant may be positioned in an out-of-normal-seating position which is sometimes referred to as out-of-position (OOP). As an example, one such out-of-position seating orientation might include a child resting within the corner formed by the outer edge of the seat and the adjacent side of the vehicle. Ideally the inflating airbag should accommodate an out-of-position occupant.

The present invention provides a new and improved airbag for protection of the vehicle occupant during an impact collision which accounts for an out-of-position occupant during inflation of the airbag.

BRIEF SUMMARY OF THE INVENTION

In at least one embodiment, the present invention provides a side airbag for protection of a vehicle occupant. The side airbag is adapted to be inflated by gas from an inflator. The side airbag comprises a side panel which forms an exterior of the side airbag. The side panel forms a vent hole for venting the inflation gas outside the side airbag. A closing panel is disposed about the vent hole. The closing panel is configured such that the vent hole is unobstructed to vent the gas during initial inflation of the side airbag. Despite such venting, if deployment of the side airbag is unobstructed, the side airbag will inflate. When the unobstructed side airbag is substantially inflated, the side and closing panels cooperate to obstruct the vent hole with the closing panel such that the gas is substantially not vented. If on the other hand, deployment of the side airbag is obstructed, for example due to the proximity of an out-of-position occupant, "normal" deployment and inflation of the side airbag is inhibited, the vent hole continues to vent inflation gas, preventing undesired pressurization of the side airbag.

In at least one other embodiment, the present invention provides a side airbag system for protection of a vehicle occupant. The side airbag system is mounted in a seat for the occupant. The side airbag system comprises an inflatable side airbag stored in a deflated condition and when inflated, the side airbag positions itself between the occupant and a side of the vehicle. The side airbag includes a side panel which forms an exterior of the side airbag. The side panel defines a vent hole. A closing panel is joined to the side panel at two opposed locations disposed about the vent hole. The side airbag system further comprises an inflator for inflating the side airbag with a gas. The inflator is disposed within the side airbag. The vent hole is unobstructed to vent the gas to outside the side airbag during inflation of the side airbag until the side airbag is substantially inflated. The side and closing panels cooperate to obstruct the vent hole with the closing panel such that the gas is substantially not vented when inflation and deployment of the side airbag is not inhibited by an out-of-position occupant.

BRIEF DESCRIPTION OF THE DRAWINGS

FIG. 2 is a perspective view of a side airbag system in accordance with an embodiment of the present invention;

FIG. 3 is a side view of a side airbag system in accordance with an embodiment of the present invention;

FIGS. 4a and 4b are cross sectional views of an airbag system in accordance with an embodiment of the present invention;

FIGS. 5a and 5b are cross sectional views of an airbag system in accordance with an embodiment of the present invention;

FIGS. 6a and 6b are cross sectional views of an airbag system in accordance with an embodiment of the present invention;

FIG. 8 is a side view of a side airbag system in accordance with an embodiment of the present invention;

FIGS. 9a and 9b are side views of an airbag system in accordance with an embodiment of the present invention;

FIGS. 10a and 10b are side views of an airbag system in accordance with an embodiment of the present invention;

FIGS. 11a-11c are side views of airbag systems in accordance with various embodiments of the present invention.

Figure 1:
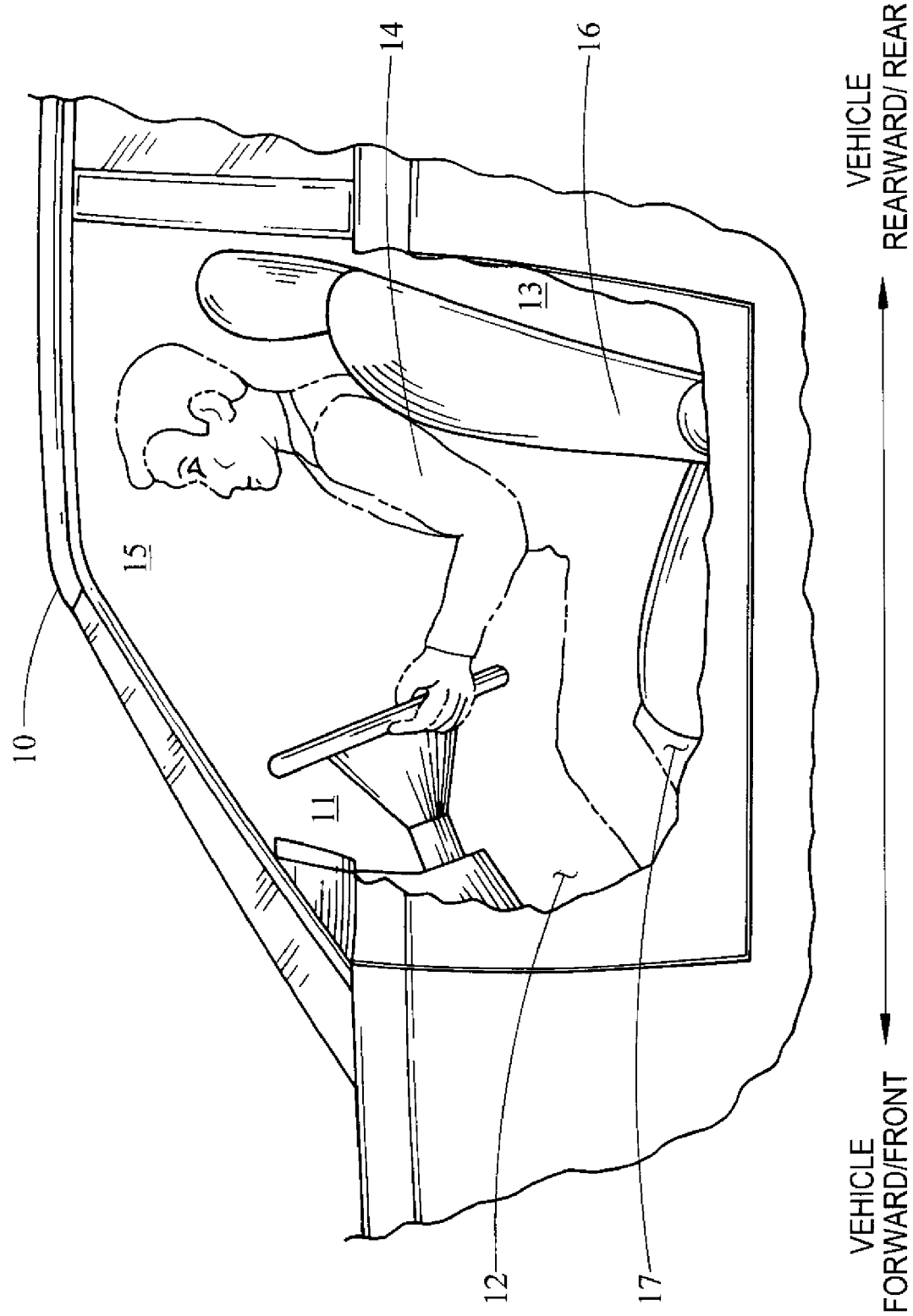
FIG. 1 is a side view of a vehicle occupant in a vehicle compartment.

Further objects, features and advantages of the invention will become apparent from consideration of the following description and the appended claims when taken in connection with the accompanying drawings.

DETAILED DESCRIPTION OF THE INVENTION

Detailed embodiments of the present invention are disclosed herein. It is understood however, that the disclosed embodiments are merely exemplary of the invention and may be embodied in various and alternative forms. The figures are not necessarily to scale, some figures may be exaggerated or minimized to show the details of a particular component. Therefore, specific structural and functional details disclosed herein are not to be interpreted as limiting but merely as a representative basis of the claims and for teaching one skilled in the art to practice the present invention.

The present invention seeks to overcome some of the concerns associated with protection of a vehicle occupant via an airbag while allowing for the possibility of the occupant being out-of-position (OOP).

Employing the principles of the present invention is an airbag including a venting system. The airbag, for example, may be part of a side airbag system. The venting system vents gas generated from an airbag inflator through a vent opening in the airbag during deployment or airbag inflation. When the airbag becomes substantially fully inflated, the venting system, acting as a closing or closed valve, obstructs the opening, such that the gas is substantially not vented through the vent opening. Thus, the gas, which may still be generating from the inflator, is substantially maintained within the airbag to more fully inflate the airbag and to absorb energy from the impact. Preferably, when the occupant is in a normal seating position, the deploying airbag becomes substantially fully inflated and the venting system obstructs the vent opening such that the inflation gas is confined within the airbag, increasing the internal airbag pressure, so as to fully inflate the airbag. Alternatively, if the occupant is out-of-position, such as being positioned too close to the airbag, the deploying airbag is prevented from becoming substantially inflated because the occupant's body blocks or obstructs the expansion of the airbag. In this situation, the venting system remains unobstructed, acting as an open valve, continues to vent the generating gas from the inflator through the opening to outside the airbag so as to continuously relieve the internal pressure of the airbag. Accordingly, obstruction of the vent hole substantially decreases the degree of venting of the gas through relative to the vent hole being unobstructed.

In at least one embodiment, the venting system is used for a side airbag system which includes protection for the occupant's thorax area. The side airbag system, after breaking free from the occupant's seat, extends generally upwardly, as in the case of telescoping pole, and behind the occupant. The remaining portion of the airbag or cushion unfolds forwardly as would be the case with a flag. In the event that the occupant is out-of-position, the airbag or cushion may be impeded from unfolding forward. In such an event, the venting system would continue to vent gas from inside the airbag to outside the airbag. However, in the case where the occupant is in a normal position, the airbag or cushion would be allowed to unfold forwardly and the venting system would become obstructed as the airbag deploys so as to substantially not vent the gas from the airbag so that preferably the airbag becomes entirely inflated with the gas.

Referring now to the drawings, FIG. 1 illustrates a motor vehicle 10 having an front occupant compartment 12 in which an occupant 14 is seated in a seat 16. An airbag (not shown) of flexible fabric may be mounted, for example, in the seat 16 and receives inflation gas from an inflator (not shown). The occupant compartment 12 has generally a forward area 11 positioned towards the front of the vehicle 10, a rearward area 13 positioned towards the rear of the vehicle 10, an upward area 15 positioned towards the top of the vehicle, and a lower area 17 positioned towards the bottom of the vehicle.

Referring to FIG. 2, an airbag employing the principles of the present invention is illustrated therein and designated at 18. The airbag 18 is shown in a partially inflated condition as it emerges from the vehicle seat 16. Mounting studs 20 (shown in FIG. 3) of the inflator 26 may be secured to a frame 22 of the seat 16 by fasteners 24 (shown in FIG. 3). Prior to activation of the inflator 26, the airbag 18 is folded or rolled into a compact configuration about the inflator 26 within the seatback and covered typically by foam and an exterior covering trim material of the seat 16.

The inflator 26 may be secured directly to the mounting frame 22 of the vehicle seat 16 or installed within a housing. The airbag 18 may be situated behind an outboard seam 28 of the seat 16 such that upon inflation of the airbag 81 the inflating airbag 18 bursts through the seam 28. As the airbag 18 continues to inflate, the airbag 18 is positioned between the side of the occupant 14 and the immediately adjacent side of the vehicle 10.

FIG. 3 illustrates a side view of an airbag system in an accordance of an embodiment of the present invention. The airbag 18 comprises a side panel 30 that forms an exterior of the airbag 18 and defines a vent hole 32. The side panel may be a single fabric type panel or a plurality of panels joined together, for example by a sewn seam or seams 31. The airbag 18 may be for protection of the occupant's thorax area and/or head area and/or pelvis area and accordingly may have corresponding chambers which function to absorb impact energy specific to these areas.

The airbag 18 may include a rear chamber 40 which generally extends substantially from the top 42 to the bottom 44 of the airbag 18 and is formed by a tube panel 46 forming a tube 48. The tube panel 46 further segments the airbag 18 so as to form a forward chamber 49 which may also be referred to as a cushion or cushion portion of the airbag 18. The inflator 26 may be positioned within a portion of the tube 48, such as for example, a rear central portion and the studs 20 of the inflator 26 may be inserted through corresponding holes defined in the airbag 18 such that a receiving inlet into the rear central portion becomes closed. The tube panel 46 may include a vent or a plurality of vents or openings 50a, 50b, 50c, and 50d for communication of the gas from the inflator 26 to the forward chamber 49. In one embodiment, the tube panel 46 includes a large vent 50b, a smaller vent 50c, an upper vent 50d and a lower vent 50a. In another embodiment, the tube panel 46 may be positioned at an incline such that the tube 48 is larger at the bottom than at the top so as to bias the volume of the gas from the inflator 26 to a lower rearward portion of the tube 48.

In at least one embodiment, the inflator 26 communicates the gas to the tube 48 which further communicates the gas to the forward chamber 49. During inflation of the airbag 18, the venting system 54, which includes the vent hole 32 and a closing panel 56, is configured such that the vent hole 32 is unobstructed and vents the gas to outside the airbag 18. When the airbag 18 is substantially fully inflated, the side and closing panels 30, 56 cooperate to obstruct the vent hole 32 with the closing panel 56 such that the gas is substantially not vented and the airbag 18 fully inflates and maintains internal gas pressure longer than airbag 18 when vent hole 32 is opened.

In one embodiment, the side panel 30 defines a second vent hole 51 which may be disposed adjacent the forward chamber 49 and preferably positioned peripherally so as to vent the gas in a direction away from the occupant 14. For example, the second vent hole 51 may be positioned along a forward peripherally edge of the airbag 18 so as to vent the gas in a forwardly direction. The second vent hole 51 preferably is unobstructed and remains open during full deployment and functions to manage and absorb energy from the impact.

FIG. 4a and FIG. 4b illustrate a sectional view of an embodiment of the venting system 54 generally indicated in FIG. 3. The closing panel 56 is disposed about the vent hole 32. For example, the closing panel 56 may be joined to the side panel 30 at two or more opposed locations 55, 57 about the vent hole 32. In one embodiment, the closing panel 56 is sewn to the side panel 30 to form two or more seams disposed about the vent hole 32. Other suitable means for joining two airbag fabric panels know to those skilled in the art may also be used. In at least one embodiment, the seams at the opposed locations 55, 57 endure full inflation of the airbag 18 without rupturing.

An inner hole 58 is defined by the closing panel 56. The vent hole 32 is unobstructed to vent gas when the inner hole 58 is aligned with the vent hole 32. The side panel 30 has a first stored portion 60 that may be, for example, comprised of folded fabric, which is sewn together to itself or sewn together with the closing panel 56 to form a first nest seam 62. The nest seam 62 facilitates maintaining the stored portion 60 in a folded or rolled arrangement during storage and initial deployment of the airbag 18, which is generally the case for all other nest seams and storage portions discussed herein. The closing panel 56 has a second stored portion 64 that may also be comprised of folded fabric, which is sewn together to itself or sewn together with the side panel 30 to form the second nest seam 66. The first and second stored portions 60, 64 are for movement of a closing panel 56 across the vent hole 32. The side and closing panels 30, 56 are configured to rupture the first and second nest seams 62, 66 when the airbag 18 is substantially fully inflated. In at least one embodiment, the airbag unfolds and the panels 30, 56 cooperate to stretch the panel portions 30, 56 between the opposed location 55, 57, thereby stressing the nest seams 62, 64 beyond their ultimate strength. Upon rupturing of the nest seams 62, 66, the side and closing panels 30, 56 move relative to one another such that the vent hole 32 and the inner hole 58 are misaligned and the vent hole 32 is covered by the closing panel 56. Preferably, the length of the side and closing panels 30, 56 disposed between the opposed locations 55, 57, with the stored portions 60, 64 unfolded, are substantially equivalent when the airbag is fully inflated.

FIGS. 5a and 5b illustrate a sectional view of another embodiment of the venting system 54 generally indicated in FIG. 3. The side panel 30 defines a first vent hole 132 and a second vent hole 134. A first inner hole 158 and a second inner hole 160 are defined by the closing panel. The vent holes 132, 134 are unobstructed when the inner holes 158, 160 are matched and aligned with the vent holes 132, 134. The side panel 30 and the closing panel 56 may each have stored portions 60, 64 for movement of the vent holes 132, 134 relative to the closing panel 56. The stored portions 60, 64 may be sewn in a folded arrangement to form corresponding nest seams 62, 66 respectively. The side and closing panels 30, 56 are configured to rupture the nest seams 62, 66 when the airbag 18 is substantially fully inflated and move the vent holes 132, 134 relative to the closing panel, thereby misaligning the holes 132, 134, 158, 160, and thus obstructing the vent holes 132, 134 with the closing panel 56.

FIGS. 6a and 6b illustrate a sectional view of another embodiment of the venting system 54 generally indicated in FIG. 3. The vent hole 32 is unobstructed with a stored portion 164 of the closing panel 56 disposed through and extends outwardly from the vent hole 32 such that there is a vent path for the gas through the vent hole 32 and above and/or below the stored portion 164. That is, the closing panel 56 has for example, a shape corresponding to a strip which extends through the vent hole 32 and is looped to allow the gas to vent below and/or above the strip in the space created by the loop. Here, the stored portion 164 may or may not have a nest seam. The stored portion 164 of the closing panel 56 is for moving across the vent hole 32. The side and closing panels 30, 56 are configured to move the stored portion 164 of the closing panel 56 inwardly through and across the vent hole 32 when the airbag 18 is substantially inflated so as to obstruct the vent hole 32. The side panel 30 may also have a stored portion or portions 165 which also may or may not have nest seams. The stored portion 165 of the side panel 30 may be disposed about the vent hole 32 and is for facilitating movement of the stored portion 164 of the closing panel 56 inwardly through and across the vent hole 32.

Figure 7A:
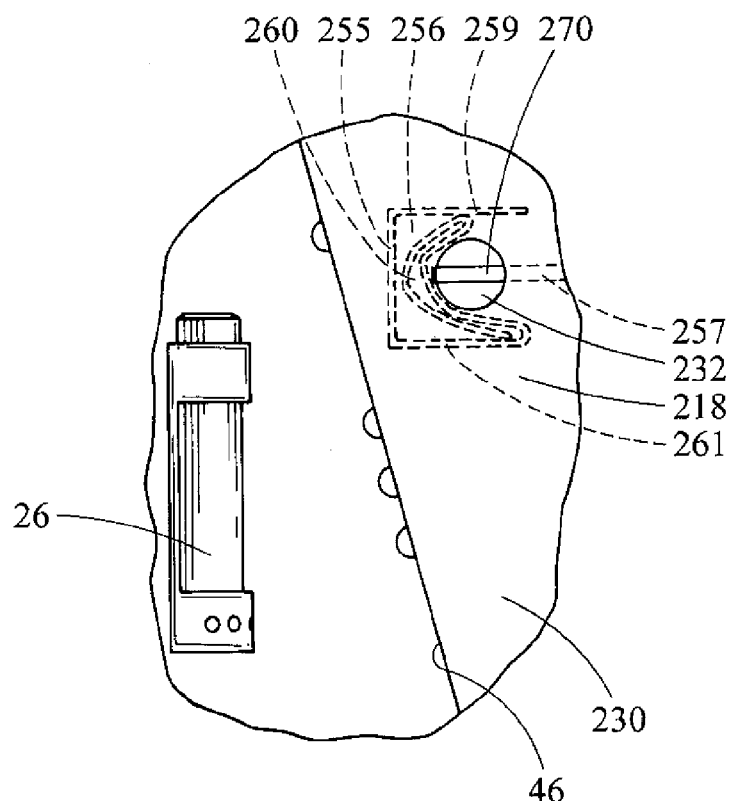
FIGS. 7a and 7b are side views of an airbag system in accordance with an embodiment of the present invention.
Figure 7B:
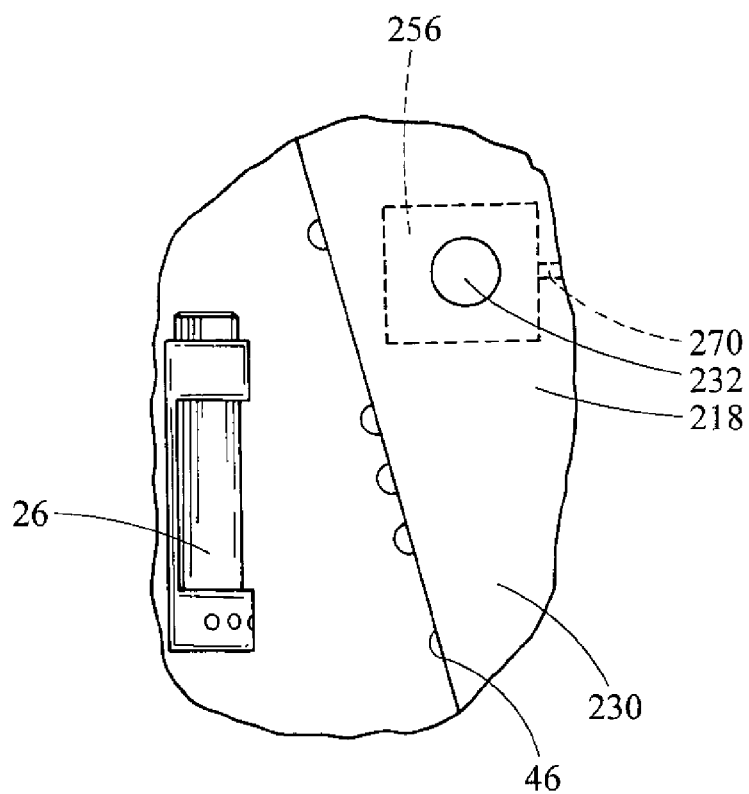
Figure 12A:
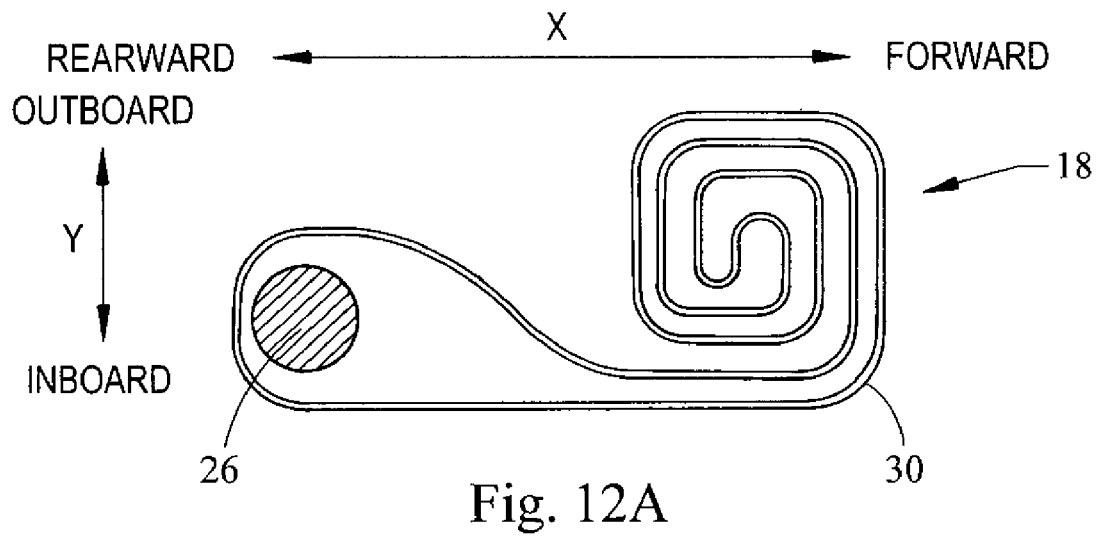
FIGS. 12a-12e are plan views of various folding arrangements of the airbag system in a deflated condition in accordance with embodiments of the present invention.
Figure 12B:
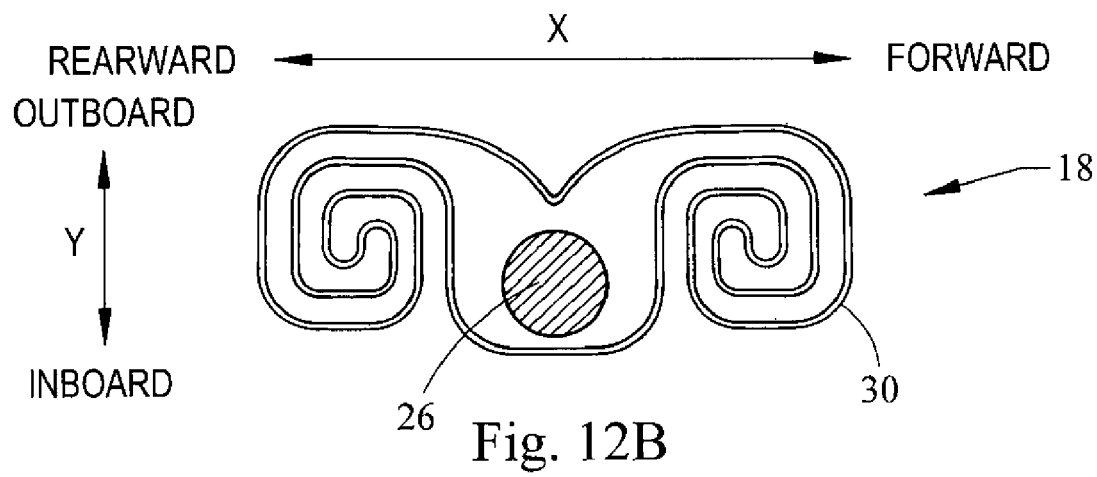
Figure 12C:
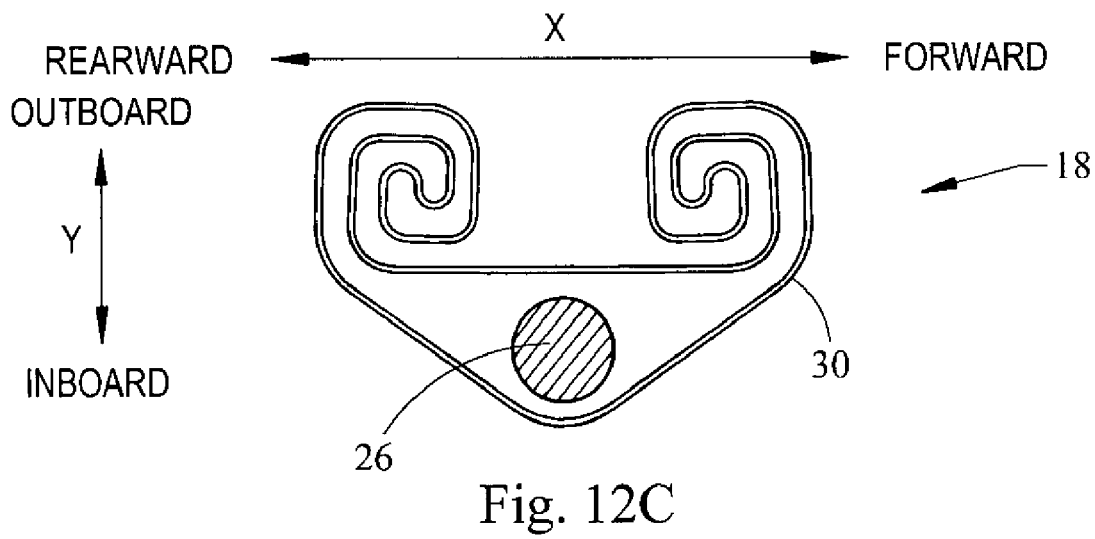
Figure 12D:
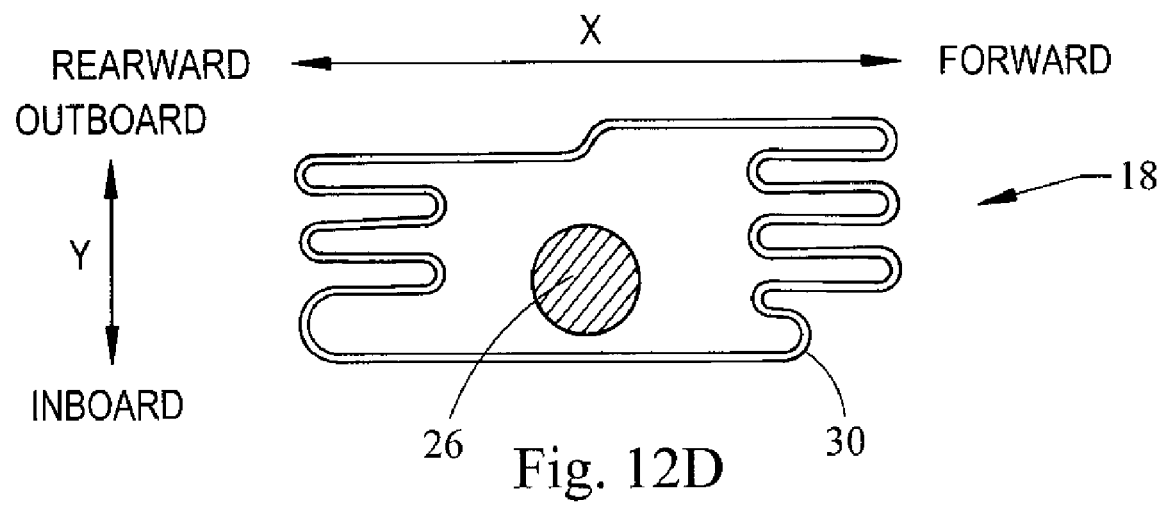
Figure 12E:
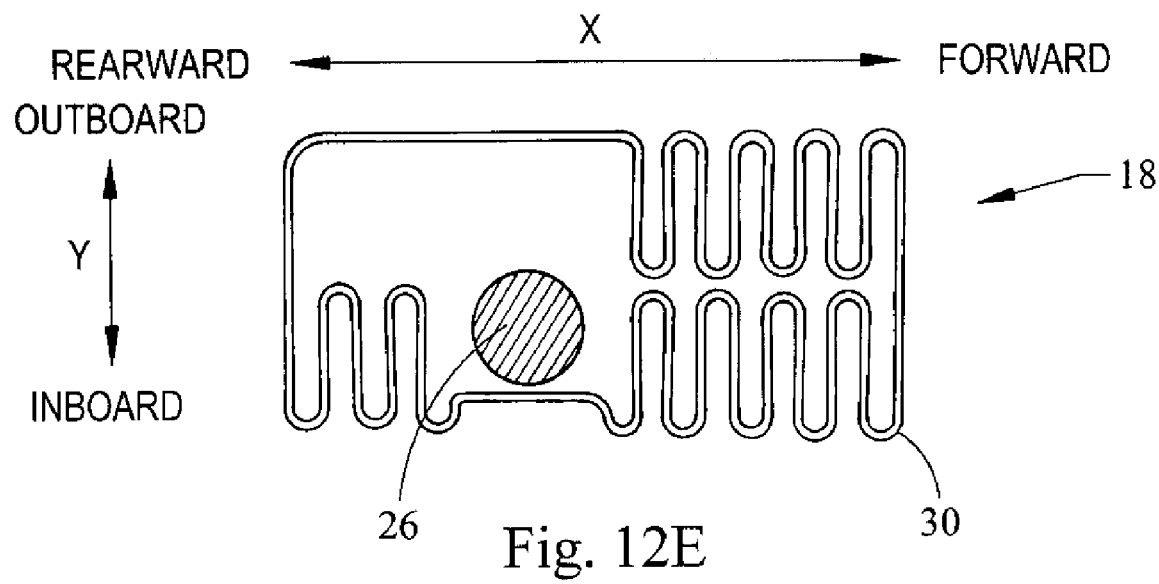

FIGS. 7a and 7b are side views of another embodiment of a venting system for an airbag in accordance with the present invention. The airbag 218 includes a side panel 230 forming an exterior of the airbag 218. A vent hole 232 is defined by the side panel 230. Joined to the side panel 230 at a plurality of opposed locations 255, 257, 259, 261 disposed about the vent hole 232 is a closing panel 256. The closing panel 256 has a stored portion 260 for movement across the vent hole 232 and includes a strap 270 having a first end 272 joined to the stored portion 260 of the closing panel 256 and a second end 274 joined to the side panel 230. The stored portion 260 is either rolled or folded fabric, which may or may not have a nest seam. The second end 274 is operable to actuate the strap 270 and move the stored portion 260 of the closing panel 256 across the vent hole 232 when the airbag 218 is substantially fully inflated so as to obstruct the vent hole 232.

FIG. 8 illustrates a side view of an airbag system in an accordance of an embodiment of the present invention. The airbag 318 may or may not include tube panel 46. The side panel 330 of the airbag 318 defines a vent hole 332 with a vent system which functions similar to the vent system illustrated in FIGS. 7a and 7b with the difference that the vent hole 332 is located in the periphery area of the side airbag 318.

Referring to FIGS. 9a-10b, various embodiments of the vent system depicted in FIG. 8 are provided. Joined to the side panel 330 at a plurality of opposed locations 335a-335c disposed about the vent hole 332 (FIGS. 9a-9b) or plurality of vent holes 332, 333 (FIGS. 10a-10b) is a closing panel 356. The closing panel 356 has a stored portion 360 for movement across the vent hole 332 or vent holes 332, 333 and includes a strap 370 having a first end 372 joined to the stored portion 360 of the closing panel 356 and a second end 374 joined to the side panel 330. The stored portion 360 is either rolled or folded fabric, which may or may not have a nest seam. The second end 374 is operable to actuate the strap 370 and move the stored portion 360 of the closing panel 356 across the vent hole 332 or holes 332, 333 when the airbag 318 is substantially fully inflated so as to substantially obstruct venting of the gas. Specifically, in FIGS. 9a and 9b the vent hole 332 is preferably a large vent hole which becomes obstructed by covering a significant portion of the vent hole 332 so as to define a smaller vent hole 336. In FIGS. 10a and 10b a portion of the total number of vent holes 332, 333 are covered such that at least one vent hole 333 is obstructed and at least another of the vent holes 332 is unobstructed. In one embodiment, the hole 332 which remains unobstructed is larger than any one of a plurality of obstructed holes 333. Preferably, the smaller vent hole 336 and/or covering of the portion of vent holes 332, 333 reduces the size of the original vent hole opening or openings that functions for an OOP occupant to a size that functions to absorb energy during a impact event of a normally positioned occupant during full airbag deployment.

The side panel 330 may also have a stored portion or portions 365 which may or may not have nest seams. The stored portion 365 may be disposed about the vent hole 332 or vent holes 332, 333 and is for facilitating actuation of the strap 370 via the second end 374 which is preferably joined about the stored portion 365.

FIGS. 11a-11c are side views of the venting system depicted in FIGS. 9a-10b with various arrangements in accordance with the present invention. The vent hole 332 or holes 332, 333 may be disposed adjacent to the tube 348 as illustrated in FIGS. 11b and 11c, in which the gas is able to exit the side airbag even before flowing into the forward chamber 349. In these alternatives it is preferable to provide a second vent 351 to absorb the energy during an impact event of a normally positioned occupant during full airbag deployment. Alternatively, the vent hole 332 or holes 332, 333 may be disposed adjacent to the forward chamber 349 and further, may be adjacent an outlet opening 350 that is for fluid communication between the tube 348 and the forward chamber 349. Preferably, the vent hole 332 or holes 332, 333 are positioned along a periphery of the airbag 330 such that when the airbag 330 is inflating the vent hole 332 or holes 332, 333 vents the gas in a direction away from the occupant 14. Due to the fact that the vent hole 332 or holes 332, 333 in this position in the forward chamber incorporates both the OOP function and the energy absorbing function a second vent hole is not necessary in this alternative according to FIG. 11a.

FIGS. 12a-12e are plan view illustrations of various embodiments of a folded arrangement for a deflated side airbag for storage within an occupant seat in accordance with the present invention. For FIGS. 8a-8e, the forward and rearward directions within the occupant compartment 12 are indicated by axis X and the inboard and outboard directions are indicated by axis Y. FIG. 8a is an outboard roll fold, which is rolled up from the forward edge of the airbag 18 towards the rearward edge which is proximate the inflator 26. In this folded arrangement, an OOP occupant will impede the forward expansion of the airbag 18 allowing the venting system to remain open. FIG. 5b and 5c are various embodiments of a double roll fold, where both the forward and rearward edges of the airbag 18 are rolled up towards the inflator 26 such that if the forward roll is blocked by an OOP occupant, the airbag 18 will deploy more rearwardly as well as allowing the venting system to remain open. FIGS. 8d and 8e are Z-pattern fold arrangements, which are similar to the double roll fold arrangements illustrated in 8b and 8c. The Z-patterned fold arrangements are also preferably deployed more rearwardly for an OOP occupant as well as allowing the venting system to remain open. In at least one embodiment, the airbag 18 is stored in a folded arrangements selected from the group consisting of an outward roll fold, a double roll fold and a double Z-fold.

As a person skilled in the art will readily appreciate, the above description is meant as an illustration of implementation of the principles of this invention. This description is not intended to limit the scope or application of this invention in that the invention is susceptible to modification, variation and change, without departing from the spirit of the invention, as defined in the following claims.

The invention claimed is:

1. A side airbag for protection of an occupant of a vehicle adapted to be inflated by gas from a gas source, wherein when inflated the side airbag positions besides the occupant, the side airbag comprising:

a side panel forming an exterior of the side airbag and defining a vent hole for venting the gas to outside the side airbag;

a closing panel disposed about the vent hole, the closing panel configured such that the vent hole is unobstructed to vent the gas during inflation of the side airbag until the side airbag is substantially fully inflated, wherein the side and closing panels cooperate to obstruct the vent hole with the closing panel such that the gas is substantially not vented through the vent hole, wherein when the side airbag is obstructed from substantially fully inflating the vent hole remains unobstructed to vent the gas; and a tube panel disposed within the side panel, wherein sides of the tube panel are joined to corresponding portions of the side panel to form a tube which extends upwards generally from a bottom of the side airbag along a rear of the side airbag such that the side airbag is segmented into a forward chamber and the tube, a portion of the tube being open to receive the gas source which communicates the gas to the tube, wherein the tube defines at least one opening to communicate the gas to the forward chamber and wherein one opening of the tube is an upper outlet opening, the vent hole and closing panel are disposed adjacent to the upper outlet opening on a side of the side airbag adjacent to the side of the vehicle when the side airbag is inflated, and wherein the tube panel is arranged at an incline to a rearward edge of the airbag such that the tube is larger at the bottom than at the top so as to bias the volume of gas from the gas source towards a lower portion of the tube.

2. The side airbag according to claim 1 wherein obstruction of the vent hole with the closing panel causes the side airbag to be entirely inflated with the gas.

3. The side airbag according to claim 1 wherein the closing panel is joined to the side panel at two opposed locations disposed about the vent hole.

4. The side airbag according to claim 1 wherein the side panel defines a second vent hole that vents the gas to outside the side airbag during inflation of the side airbag.

5. The side airbag according to claim 1 wherein the closing panel defines an inner hole and the vent hole is unobstructed when the inner hole is aligned with the vent hole.

6. The side airbag according to claim 1 wherein the side panel defines a plurality of vent holes and the closing panel defines a plurality of inner holes and the vent holes are unobstructed when the inner holes are respectively matched and aligned with the vent holes.

7. The side airbag according to claim 1 wherein the vent hole is unobstructed when a portion of the closing panel is disposed through and extends outwardly from the vent hole.

8. The side airbag according to claim 1 wherein the closing panel has a stored portion for movement across the vent hole and the side airbag further comprises a strap having a first end joined with the stored portion of the closing panel and a second end joined to the side panel, the second end operable to actuate the strap and move the stored portion of the closing panel across the vent hole to obstruct the vent hole.

9. The side airbag according to claim 8 wherein the side panel has a stored portion and the second end of the strap being joined to the side panel about the stored portion of the side panel, wherein the side panel is configured to move the stored portion of the side panel such that the second end actuates the strap.

10. The side airbag according to claim 8 wherein the side panel defines a plurality of vent holes and the strap moves the stored portion of the closing panel across a portion of the vent holes such that at least one of the vent holes is obstructed and at least another of the vent holes is unobstructed.

11. The side airbag according to claim 8 wherein the strap moves the stored portion of the closing panel across a portion of the vent hole to define a smaller vent hole.

12. The side airbag according to claim 1 wherein the side panel has a stored portion for movement of the vent hole relative to the closing panel, the stored portion sewn together to form a nest seam, wherein the side and closing panels are configured to rupture the nest seam and move the vent hole relative to the closing panel to obstruct the vent hole.

13. The side airbag according to claim 1 wherein the closing panel has a stored portion for movement across the vent hole, the stored portion sewn together to form a nest seam, wherein the side and closing panels are configured to rupture the nest seam and move the stored portion of the closing panel across the vent hole to obstruct the vent hole.

14. The side airbag according to claim 1 wherein the vent hole is unobstructed by the closing panel when stored in a deflated condition.

15. The side airbag according to claim 1 wherein the vent hole is disposed adjacent the tube and the side panel defines a second vent hole disposed adjacent the forward chamber that vents the gas to outside the side airbag during inflation of the side airbag.

16. A side airbag system for protection of an occupant of a vehicle that is mounted in a seat for the occupant, the system comprising:
   an inflatable side airbag stored in a deflated condition and when inflated the side airbag positions besides the occupant, the side airbag including:
      a side panel forming an exterior of the side airbag that has a forward edge and a rearward edge, the side panel defining a vent hole;
      a closing panel joined to the side panel at two opposed locations disposed about the vent hole;
      a gas source disposed within the side airbag and for inflating the side airbag with gas, wherein the vent hole is unobstructed to vent the gas to outside the side airbag during inflation of the side airbag until the side airbag is substantially inflated, wherein the side and closing panels cooperate to obstruct the vent hole with the closing panel such that the gas is substantially not vented through the vent hole, wherein when the side airbag is obstructed from substantially fully inflating the vent hole remains unobstructed to vent the gas; and
      a tube panel disposed within the side panel, wherein sides of the tube panel are joined to corresponding portions of the side panel to form a tube which extends upwards generally from a bottom of the side airbag along a rear of the side airbag such that the side airbag is segmented into a forward chamber and the tube, a portion of the tube being open to receive the gas source which communicates the gas to the tube, wherein the tube defines at least two openings to communicate the gas to the forward chamber and wherein one of the openings of the tube is an upper outlet opening that is formed in an upper portion of the tube and another of the openings is a lower outlet opening that is formed in a lower portion of the tube, the lower outlet opening is larger than the upper outlet opening, the vent hole and closing panel are disposed adjacent to the upper outlet opening on a side of the side airbag adjacent to the side of the vehicle when the side airbag is inflated, and wherein the tube panel is arranged at an incline to the rearward edge of the airbag extending from a lower section of the forward edge to an upper section of the rearward edge such that the tube is larger at the bottom than at the top so as to bias the volume of gas from the gas source towards a lower portion of the tube.

17. The system according to claim 16 wherein the vent hole is positioned along a periphery of the side airbag such that when the side airbag is inflating the vent hole vents the gas in a direction away from the occupant.

18. The system according to claim 16 wherein the side airbag is stored in a folded arrangement selected from the group consisting of an outboard roll fold, a double roll fold and a double Z-fold.

19. The system according to claim 16 wherein the closing panel has a stored portion disposed through and extending outwardly from the vent hole that is for movement across the vent hole, wherein the side and closing panels are configured to move the stored portion of the closing panel across the vent hole to obstruct the vent hole.

20. The system according to claim 16 wherein the closing panel has a stored portion for movement across the vent hole and includes a strap having a first end joined with the stored portion of the closing panel and a second end joined to the side panel and operable to actuate the strap and move the stored portion of the closing panel across the vent hole to obstruct the vent hole.

21. The system according to claim 16 wherein the closing panel defines an inner hole and the vent hole is unobstructed when the inner hole is aligned with the vent hole, the side panel has a first stored portion sewn together to form a first nest seam, the closing panel has a second stored portion sewn together to form a second nest seam, the first and second stored portions are for movement of the closing panel across the vent hole, wherein the side and closing panels are configured to rupture the first and second nest seams and move the closing panel across the vent hole to obstruct the vent hole.

* * * * *